(12) United States Patent
Nepola

(10) Patent No.: US 11,156,856 B2
(45) Date of Patent: Oct. 26, 2021

(54) EYEWEAR WITH WEARING STATUS DETECTOR

(71) Applicant: Tom Nepola, Paterson, NJ (US)

(72) Inventor: Tom Nepola, Paterson, NJ (US)

( * ) Notice: Subject to any disclaimer, the term of this patent is extended or adjusted under 35 U.S.C. 154(b) by 347 days.

(21) Appl. No.: 16/401,825

(22) Filed: May 2, 2019

(65) Prior Publication Data

US 2020/0348540 A1    Nov. 5, 2020

(51) Int. Cl.
*G02C 11/00*    (2006.01)

(52) U.S. Cl.
CPC .................................. *G02C 11/10* (2013.01)

(58) Field of Classification Search
CPC .............. G02B 27/017; G02B 27/0176; G02B 27/0178; G02C 11/00; G02C 11/10
USPC .................................................. 351/41–178
See application file for complete search history.

(56) References Cited

U.S. PATENT DOCUMENTS

| 2,020,629 | A | 11/1935 | Yoe |
| 3,087,383 | A | 6/1963 | Ralph |
| 4,113,365 | A | 9/1978 | Koketsu |
| 4,280,758 | A | 7/1981 | Flader et al. |
| 4,289,386 | A | 9/1981 | Brandstetter |
| 5,664,578 | A | 9/1997 | Boczan |
| 5,694,194 | A | 12/1997 | Morrison |
| 10,018,852 | B2 | 7/2018 | Hamilton et al. |
| 10,061,144 | B2 | 8/2018 | Howell et al. |
| 2015/0362745 | A1* | 12/2015 | Hamilton ............... G02C 5/124 351/55 |
| 2017/0090219 | A1* | 3/2017 | Howell .................... G02C 5/14 |
| 2020/0073150 | A1* | 3/2020 | Belli .................. A61B 5/02438 |
| 2020/0129124 | A1* | 4/2020 | Harvey ................ A61B 5/6814 |

FOREIGN PATENT DOCUMENTS

WO    2016037120 A1    3/2016

OTHER PUBLICATIONS

Hilo Adjustable Eyewear; online: https://hiloeyewear.com; David and Paul Englehardt; website states 'since 1978'.

* cited by examiner

*Primary Examiner* — Marin Pichler
(74) *Attorney, Agent, or Firm* — Myers Wolin, LLC

(57) ABSTRACT

An embodiment of the present disclosure provides an eyewear including: a front frame; and a wearing status detector detecting that the eyewear is worn.

11 Claims, 5 Drawing Sheets

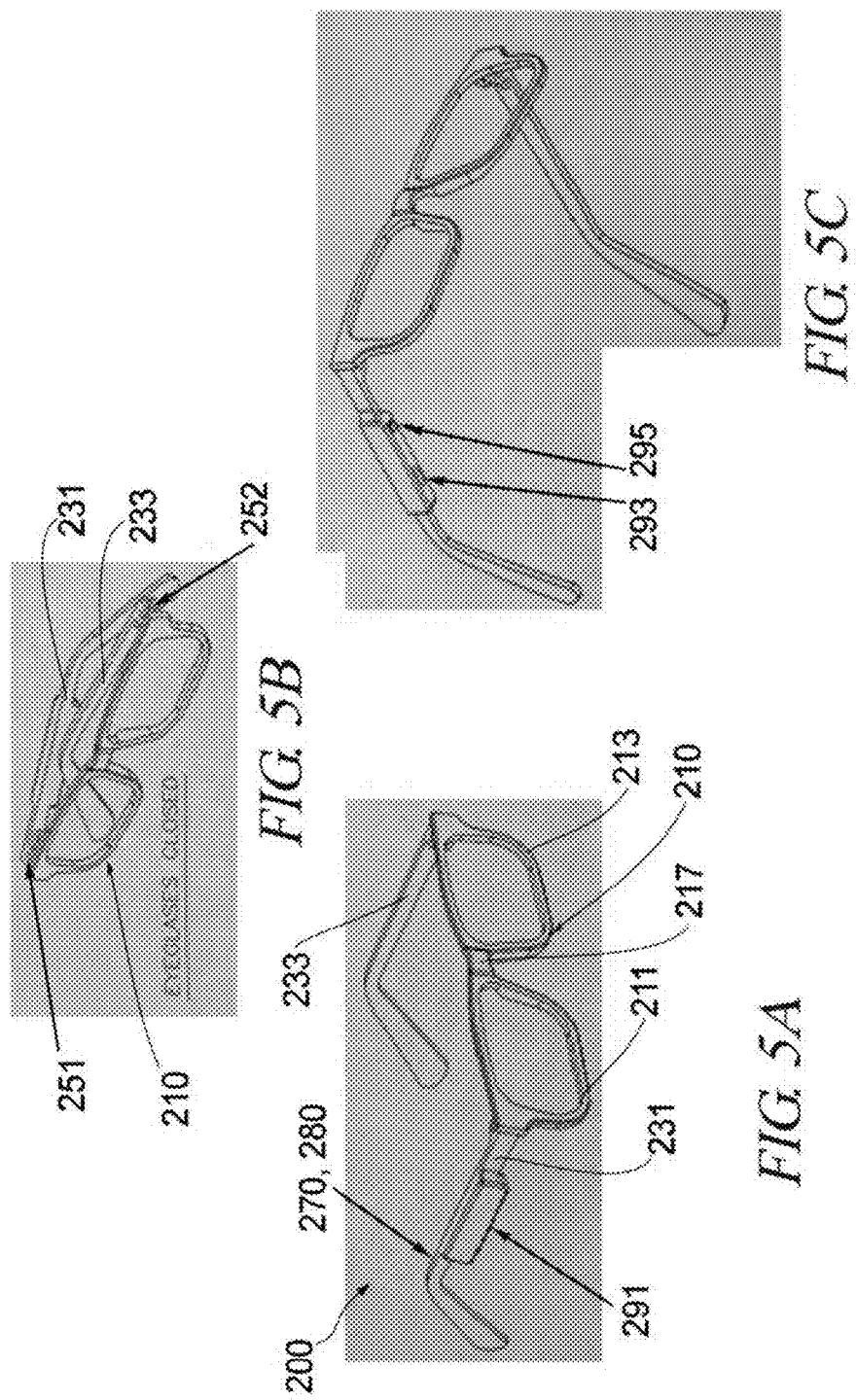

EYEWEAR WITH WEARING STATUS DETECTOR

FIELD

The present disclosure generally relates to eyewear with a wearing status detector.

BACKGROUND

Eyewear is commonly used for various purposes, including eye protection, vision correction, and viewing of specific visual information (e.g., three-dimensional visual information). In some situations where eyewear should be worn, there may be users who wear their eyewear improperly.

SUMMARY

An embodiment of the present disclosure provides an eyewear including: a front frame; and a wearing status detector detecting that the eyewear is worn.

Another embodiment of the present disclosure provides an eyewear comprising: a front frame; circuitry and a sensor configured to detect the wearing status of the eyewear; and an indicator connected to the circuitry and configured to provide a notification of the wearing status of the eyewear.

DRAWINGS

Figure 1:
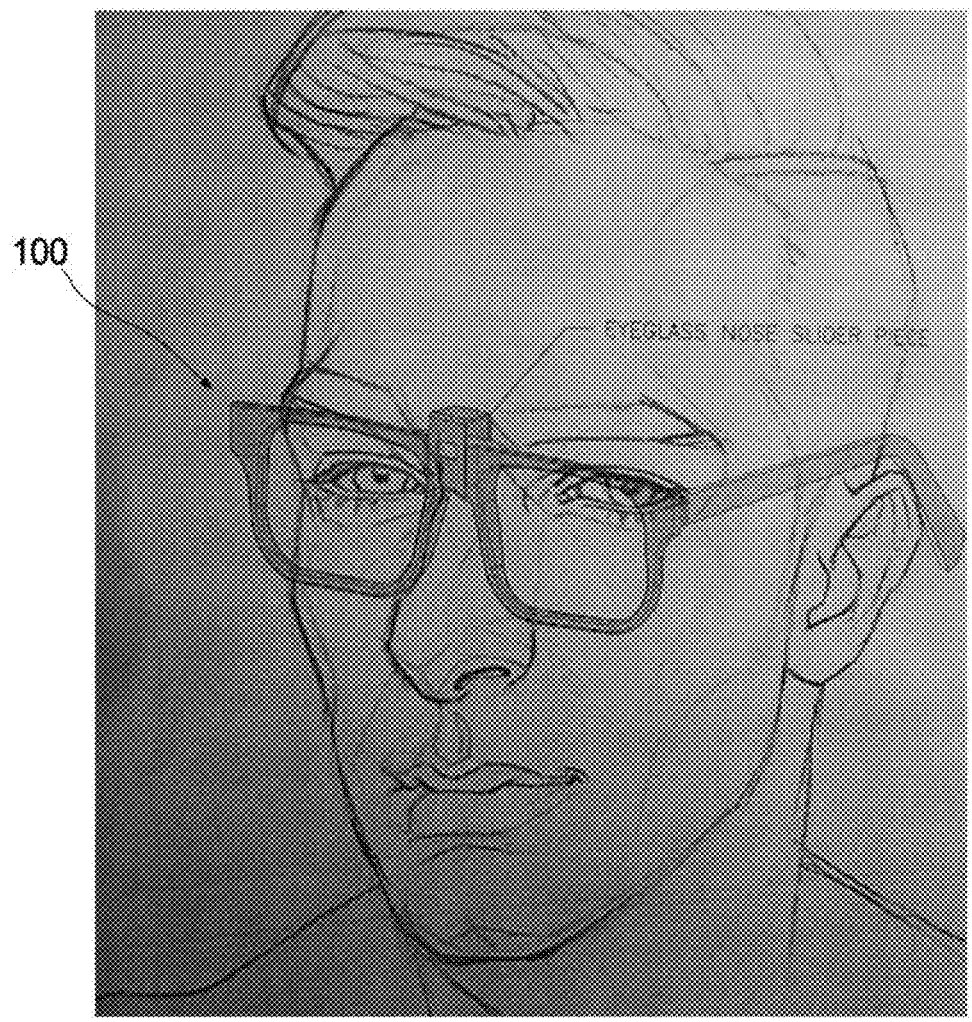
FIG. 1 illustrates an example use of eyewear according to one embodiment.

FIGS. 5A, 5B, and 5C illustrate perspective views of eyewear according to one embodiment.

EMBODIMENTS

The description of illustrative embodiments according to principles of the present disclosure is intended to be read in connection with the accompanying drawings, which are to be considered part of the entire written description. In the description of embodiments of the disclosure disclosed herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

This disclosure describes the best mode or modes of practicing the disclosure as presently contemplated. This description is not intended to be understood in a limiting sense, but provides an example of the disclosure presented solely for illustrative purposes by reference to the accompanying drawings to advise one of ordinary skill in the art of the advantages and construction of the disclosure. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

FIG. 1 illustrates an example use of eyewear according to one embodiment.

The eyewear 100 shown in FIG. 1 may be eyeglasses that are typically used for eye protection, for example, in a plant or construction site. While the eyewear 100 may be typically used for eye protection, the eyewear 100 may be used for any other purposes such as vision correction, viewing of specific visual information (e.g., three-dimensional visual information, virtual reality, and augmented reality), etc.

Figure 2A:
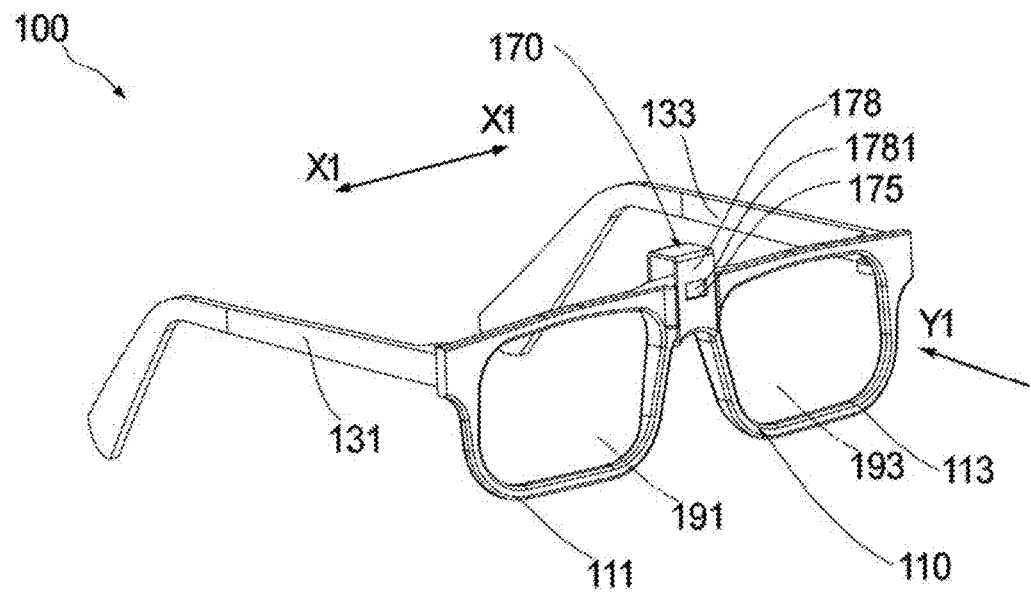
FIGS. 2A and 2B illustrate perspective views of eyewear according to one embodiment.
Figure 2B:
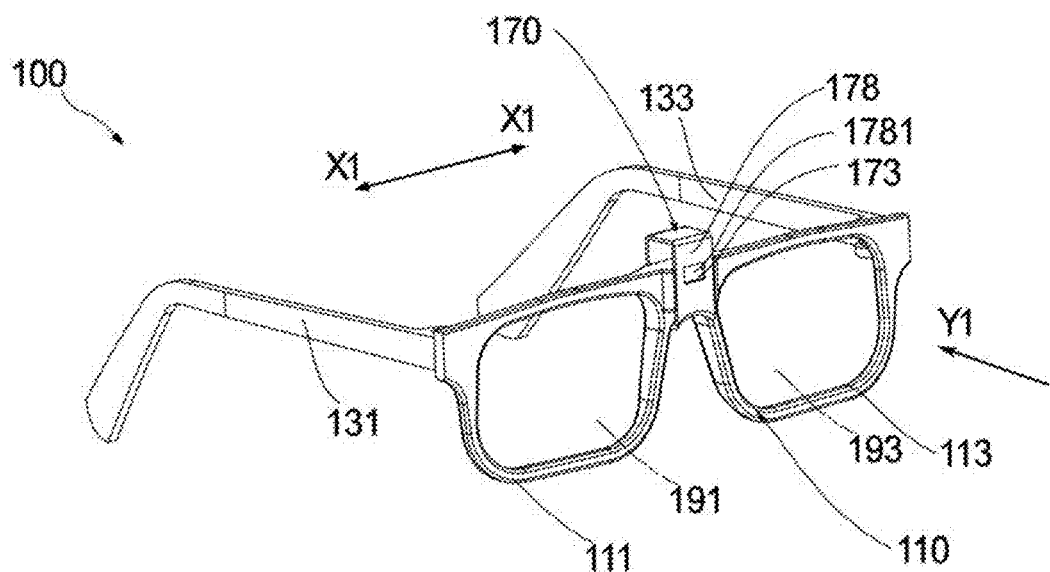

FIGS. 2A and 2B illustrate perspective views of the eyewear 100.

The eyewear 100 may include a front frame 110, a first temple 131, and a second temple 133. The front frame 110 may typically hold one or more lens of the eyewear 100. As shown in the figures, the front frame 110 may include a first lens holder 111 and a second lens holder 113. The first lens holder 111 may hold a lens 191, and the second lens holder 113 may hold a lens 193. The first lens holder 111 and the second lens holder 113 may be disposed next to each other. In another example (not shown), the front frame 110 may include only one lens holder holding only one lens that is configured to cover both eyes of the user. The first and second temples 131 and 133 may each extend from the front frame 110. As shown in the illustrated embodiment, the first temple 131 may extend from the first lens holder 111, and the second temple 133 may extend from the second lens holder 113. The first temple 131 and the second temple 133 may be put on ears of the user of the eyewear 100. Each of the first temple 131 and the second temple 133 may bend relative to the front frame 110 via a hinge. Alternatively, the first and second temples 131 and 133 may be fixed to the front frame 110 such that the temples 131 and 133 cannot bend relative to the front frame 110. In one example, the eyewear may include another structure (e.g., elastic band) other than the temples 131 and 133, such that the eyewear can be attached to a user's face.

As shown in FIGS. 2A and 2B, the eyewear 100 may further include a wearing status detector 170. The wearing status detector 170 may detect that the eyewear 100 is being worn by the user. One example of the eyewear being properly worn may be a state where the lenses 191 and 193 are located in front of the eyes of the user. One example of the eyewear being improperly worn or being not worn may be a state where the lens 191 or 193 is not located in front of the eyes of the user. In the illustrated example, detecting by the wearing status detector 170 that the eyewear 100 is being worn may be conducted, for example, by using an element (e.g., a detecting element 171 in FIGS. 3A and 3B discussed below) movable when the user is wearing the eyewear 100. However, detecting of the eyewear 100 being worn is not limited to this method, but may include using a sensor such as human-body sensors that may include a temperature sensor, an optical sensor, a touch sensor, and the like. The wearing status detector 170 may be disposed at the front frame 110, and may be disposed substantially at a center of the front frame 110 in a lateral direction X1. However, the wearing status detector 170 may be disposed at any other location of the eyewear 100, including the temples 131, 133.

Figure 3A:
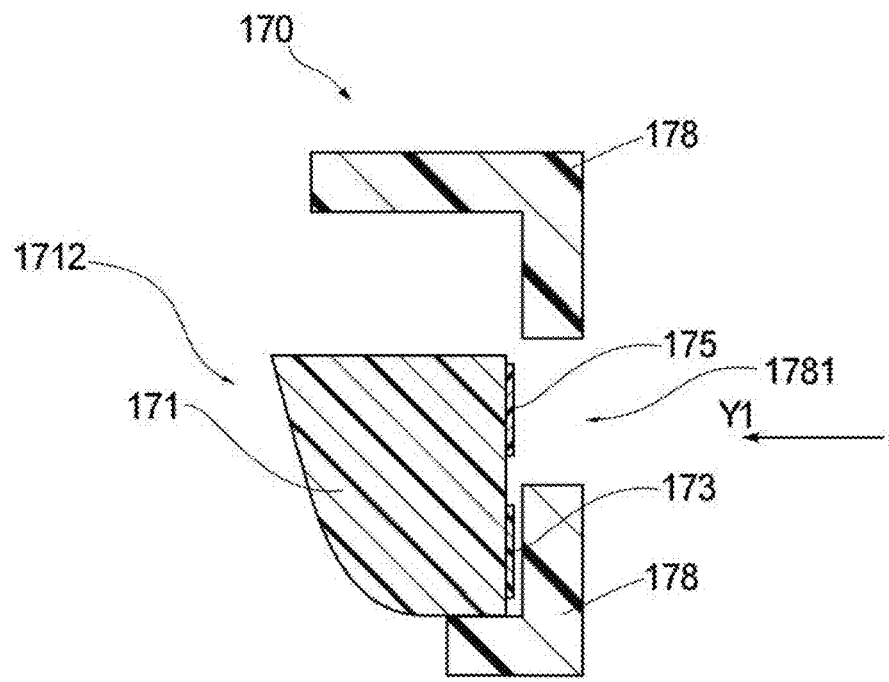
FIGS. 3A and 3B illustrate exemplary cross-sectional views of a wearing status detector according to one embodiment.
Figure 3B:
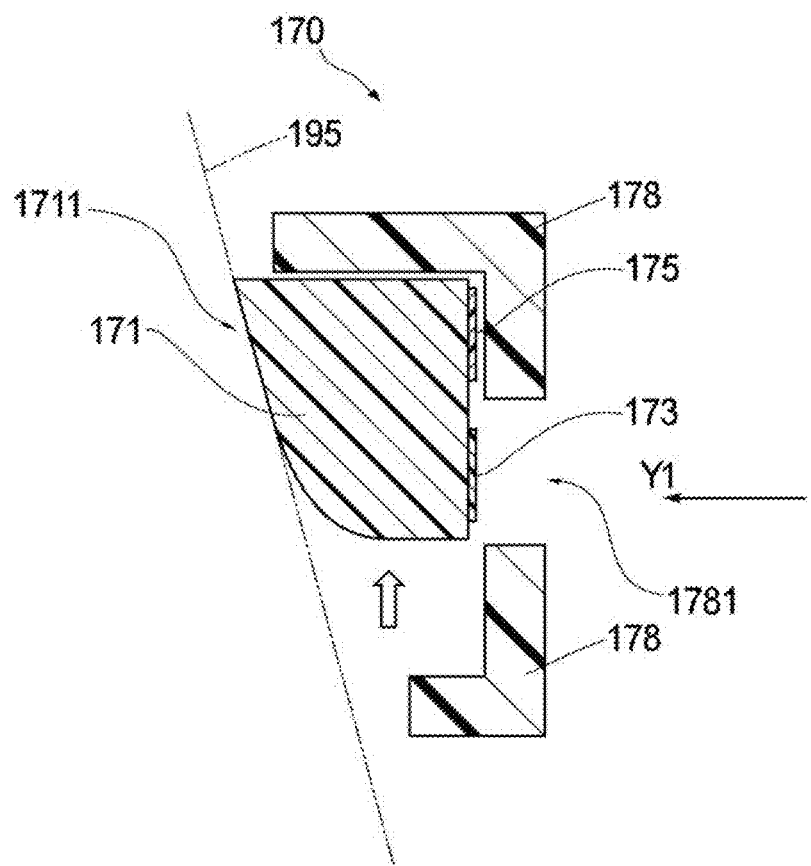

FIGS. 3A and 3B illustrate exemplary partial cross-sectional views of a wearing status detector 170. In the illustrated example, the wearing status detector 170 may include a detecting element 171, a first indicator 173, a second indicator 175, and a cover 178.

Returning to FIGS. 2A and 2B, the cover 178 may be attached to one or more of the front frame 110 or the temple 131 or 133. In the illustrated example, the cover 178 is attached to the front frame 110. The cover 178 may be disposed between the first and second lens holders 111 and 113, and may be attached to each of the first and second lens holders 111 and 113. Optionally, as shown in FIGS. 2A, 2B, 3A, and 3B, the cover 178 may define a window 1781. The window 1781 may be visible as viewed from a front side of the eyewear 100 to a back side of the eyewear 100 (i.e., as viewed in a direction Y1 in FIGS. 2A, 2B, 3A, and 3B).

With reference to FIGS. 3A and 3B, the detecting element 171 may be configured to be located at a first position 1711 (see FIG. 3B) when the eyewear 100 is worn and to be located at a second position 1712 (see FIG. 3A) when the eyewear 100 is not worn. In the eyewear 100, the first position 1711 is different from the second position 1712. In the illustrated example shown in FIGS. 3A and 3B, in the eyewear 100, the first position 1711 may be higher than the second position 1712, but any other locational relationship of the first position 1711 and the second position 1712 may be adopted. In another embodiment, the detecting element 171 may remain in the same position while the cover 178 moves when the eyewear 100 is worn or not worn. The detecting element 171 may be accommodated within the cover 178. The detecting element 171 may be movable between the first position 1711 and the second position 1712 within the cover 178. As shown in FIGS. 3A and 3B, the detecting element 171 may be configured to move when the detecting element 171 becomes in contact with a skin 195, or hair, of the user of the eyewear 100. In one example, the detecting element 171 may be configured to slide upward when the detecting element 171 becomes in contact with a nose of a user of the eyewear 100.

With reference to FIGS. 2B and 3B, the first indicator 173 may indicate, when the detecting element 171 is at the first position 1711, that the eyewear 100 is worn. As shown in FIGS. 2B and 3B, the first indicator 173 may be visible through the window 1781 as viewed from the front side of the eyewear 100 to the back side of the eyewear 100 (as viewed in the direction Y1). In the illustrated example shown in FIGS. 3A and 3B, the first indicator 173 may be formed on the detecting element 171.

With reference to FIGS. 2A and 3A, the second indicator 175 may indicate, when the detecting element 171 is at the second position 1712, that the eyewear 100 is not worn. As shown in FIGS. 2A and 3A, the second indicator 175 may be visible through the window 1781 as viewed from the front side of the eyewear 100 to the back side of the eyewear 100 (as viewed in the direction Y1). In the illustrated example shown in FIGS. 3A and 3B, the second indicator 175 may be formed on the detecting element 171. In one embodiment, the first and second indicators 173 and 175 may be integrated into one indicator that simply alters the indication to notify of a change in status. In one embodiment, an indicator may be triggered by motion using, for example, a motion detector.

The first and second indicators 173 and 175 may differ in indicating features from each other. This may allow for another person (e.g., the user's supervisor) to acknowledge whether the eyewear 100 is being properly worn by the user. Such indicating features of the indicators 173 and 175 may include colors, marks, lights, LEDs, designs, patterns, sound, smell, heat, infrared, radio, vibration, words, and/or letters. In one embodiment where the indicating features are colors, as shown in FIGS. 2A and 3A, the second indicator 175 (e.g., red) may appear in the window 1781 when the user does not wear the eyewear 100. Then, as shown in FIGS. 2B and 3B, when the user is wearing the 100, the detecting element 171 may become in contact with the skin 195 (e.g. a nose) of the user of the eyewear 100, and slide upward. Then, the first indicator 173 (e.g., green) may appear in the window 1781, thereby the eyewear 100 being properly worn may be acknowledged.

According to the present embodiment, whether the eyewear 100 is properly worn may be acknowledged by using the wearing status detector 170. This can ensure that the eyewear 100 is properly worn. In one embodiment where the eyewear 100 is used as safety eyeglasses, the eyewear 100 may more effectively ensure that the user of the eyewear 100 is in compliance with safety rules (e.g., plant safety rules).

Figure 4A:
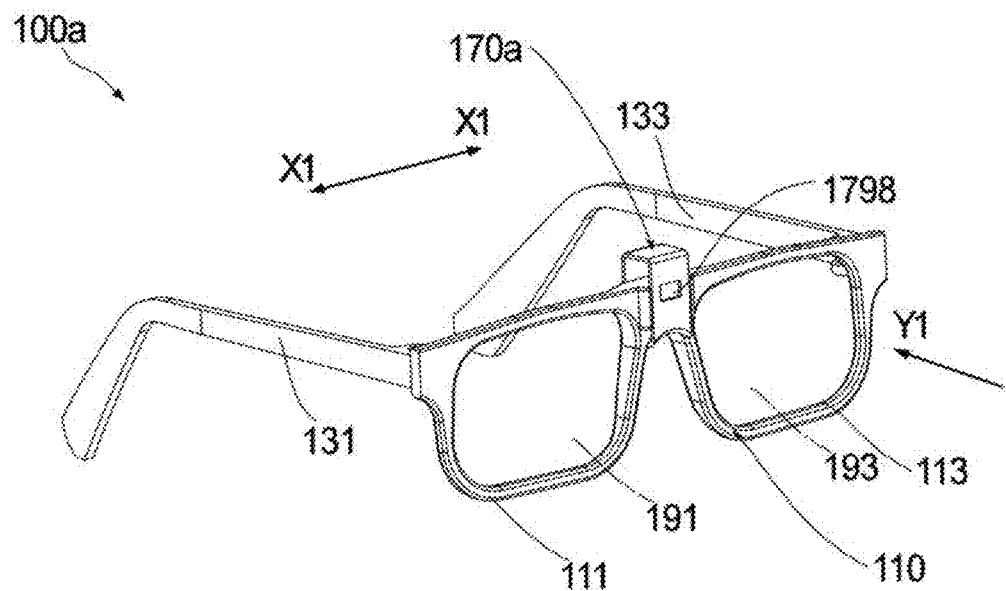
FIG. 4A illustrates a perspective view of one example of an eyewear according to one embodiment.

FIG. 4A is a perspective view of another example of an eyewear. The eyewear 100a shown in FIG. 4A includes a wearing status detector 170a.

Figure 4B:
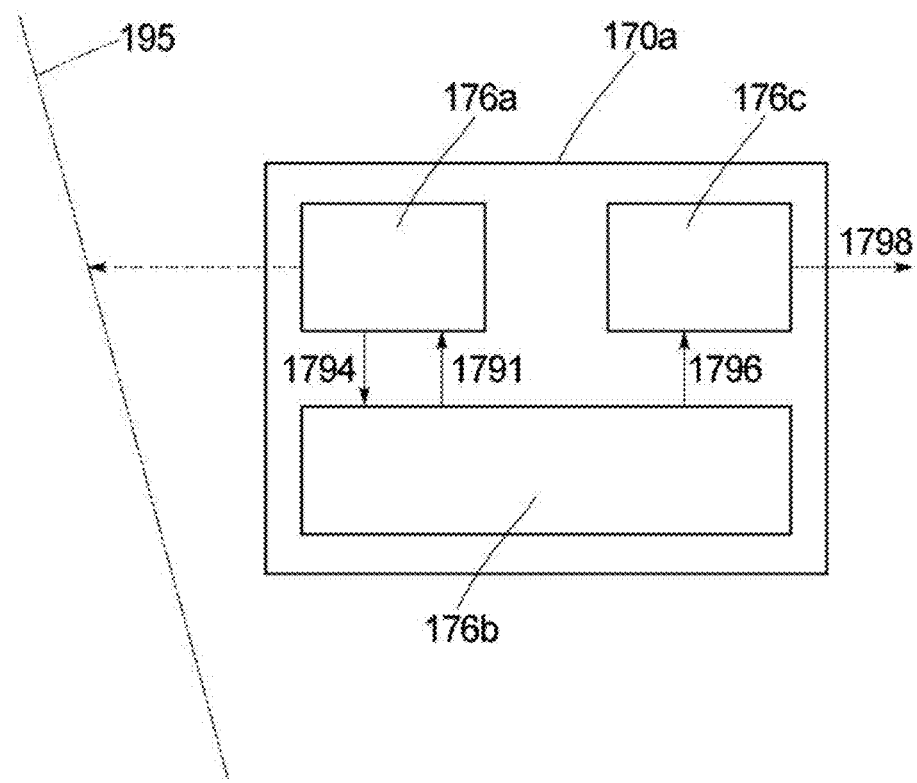
FIG. 4B illustrates a block diagram of wearing status detector according to one embodiment.

FIG. 4B is a block diagram of the wearing status detector 170a. In one embodiment shown in FIG. 4B, the wearing status detector 170a may detect the wearing status of the eyewear 100a with a sensor 176a. Examples of the sensor 176a include human-body sensors that may include a temperature sensor, an optical sensor, a touch sensor, and the like. The sensor 176a may be configured to detect the skin 195 or hair of the user of the eyewear 100a.

The wearing status detector 170a may further include circuitry 176b and an indicator 176c. The circuitry 176a and the sensor 176a may be configured to detect a wearing status of the eyewear 100a. The indicator 176c may be connected to the circuitry 176b and be configured to provide a notification 1798 (see FIGS. 4A and 4B) of the wearing status of the eyewear 100a. The notification 1798 may include, but is not limited to, at least one of a light, a sound, a smell, a heat, an electrical signal, and a word.

One example of detecting of the wearing status of the eyewear 100a by the detector 170a may be conducted as follows. In one example, the circuitry 176b may transmit a control signal 1791 to the sensor 176a to control the sensor 176a. Based on the control signal 1791, the sensor 176a may detect the skin 195 or hair of the user of the eyewear 100a. When the eyewear 100a is worn, the sensor 176a may detect the skin 195 or hair of the user of the eyewear 100a, and then may transmit a detection signal 1794 indicating a detection to the circuitry 176b. When the circuitry 176b receives the detection signal 1794 from the sensor 176a, the circuitry 176b may determine that the wearing status of the eyewear 100a is a status where the eyewear 100a is worn, and then may transmit, to the indicator 176c, a wearing status signal 1796 indicating that the eyewear 100a is worn. When the indicator 176c receives the wearing status signal 1796, the indicator 176c may provide the notification 1798 indicating that the eyewear 100a is worn. When the eyewear 100a is not worn, the sensor 176a may not detect the skin 195 or hair of the user of the eyewear 100a, and then may transmit a detection signal 1794 indicating a lack of detection to the circuitry 176b. When the circuitry 176b receives the detection signal 1794 from the sensor 176a, the circuitry 176b may determine that the wearing status of the eyewear 100a is a status where the eyewear 100a is not worn, and then may transmit, to the indicator 176c, a wearing status signal 1796 indicating that the eyewear 100a is not worn. When the indicator 176c receives the wearing status signal 1796, the indicator 176c may provide the notification 1798 indicating that the eyewear 100a is not worn. In one example, the eyewear 100a may include a wireless transmitter (not shown) that can be triggered by the sensor 176a and that transmit a signal wirelessly to a wireless receiver.

According to the present embodiment, whether the eyewear 100a is properly worn or not may be acknowledged by using the wearing status detector 170a. This can ensure that the eyewear 100a is properly worn. In one embodiment where the eyewear 100a is used as safety eyeglasses, the eyewear 100a may more effectively ensure that the user of the eyewear 100a is in compliance with safety rules (e.g., plant safety rules).

FIGS. 5A, 5B, and 5C illustrate perspective views of an eyewear according to one embodiment. The eyewear shown in FIGS. 5A, 5B, and 5C may include features of the eyewear, described with reference to FIGS. 1-4B.

The eyewear 200 shown in FIG. 5A may include a front frame 210, a first temple 231, and a second temple 233. Configurations of the front frame 210 are the same as or similar to those of the front frame 110 discussed above in view of FIGS. 2A and 2B except for that the front frame 210 includes a nose bridge 217 that connects a first lens holder 211 and a second lens holder 213.

The first and second temples 231 and 233 may be the same as or similar to the first and second temples 231 and 233 discussed above in view of FIGS. 2A and 2B. In the embodiment shown in FIGS. 5A-5C, a first hinge 251 may be attached to the front frame 210 and to the first temple 231 such that the first temple 231 bends relative to the front frame 210 via the first hinge 251, and the second hinge 252 may be attached to the front frame 210 and to the second temple 233 such that the second temple 233 bends relative to the front frame 210 via the second hinge 252.

The eyewear 200 may further include wearing status detectors 270 and 280. The wearing status detector 270 may detect that the eyewear 200 is worn by a user. In the illustrated example, the wearing status detector 270 may be a temperature sensor that detects a skin temperature (e.g., ear temperature) of the user. The wearing status detector 270 may be disposed, for example without limitation, on one of the first and second temples 131 and 133. The wearing status detector 280 may detect that at least one of the first and second temples is unfolded. The detection by the temple status detector 280 may be conducted, for example, by sensing that the first and second temples 231 and 233 are in contact with the front frame 210.

Optionally, the eyewear 200 may include a battery and electronics compartment 291. The electronic devices in the compartment 291 may control the wearing status detectors 270 and 280. As shown in FIG. 5C, the compartment 291 may include a charging point 293, e.g. USB, and an on/off switch 295. The compartment 291 may be integrated inside of the first temple 231 and/or the second temple 233. The wearing status detector and/or the compartment may work together to communicate (send and receive via a wireless transceiver, transmitter and/or receiver) information pertaining to the wearing status of the eyewear to a third party. This third party may be a computer, server, laptop, mobile device, network, cloud network, artificial intelligence system, or person. This communication may take place using any combination of the following technology: Wifi, Bluetooth, wired connection (e.g. Ethernet and/or USB), infrared, satellite, radio, and/or microwaves. In addition, the user may be notified of the wearing status of the eyewear 100 via an audible sound using, for example, a speaker separate from or integrated into the eyewear 100, a smell, a vibration, words, and/or lights. Further, a monitoring system for monitoring the wearing status of a plurality of pair of the eyewear 200 may be provided. The monitoring system may collect information of the wearing status from each eyewear, and may display the information of each eyewear.

According to the present embodiment shown in FIGS. 5A-5C, whether the eyewear 200 is properly worn may be acknowledged by using the wearing status detector 270 or 280. This can ensure that the eyewear 200 is properly worn. In particular, in the present embodiment, whether the eyewear 200 is properly worn may be acknowledged by sensing a skin temperature with the wearing status detector (e.g., a temperature sensor) 270 and by sensing with the status detector 280 that the temples 231 and 233 are unfolded. This can further ensure that the eyewear 200 is properly worn. In one embodiment where the eyewear 200 is used as safety eyeglasses, the eyewear 200 may more effectively ensure that the user of the eyewear 200 is in compliance with safety rules (e.g., plant safety rules).

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:
1. An eyewear comprising:
  a front frame; and
  a wearing status detector detecting that the eyewear is worn,
  wherein the wearing status detector includes:
   a detecting element configured to be located at a first position when the eyewear is worn and to be located at a second position when the eyewear is not worn, the first position being different from the second position;

a first indicator indicating, when the detecting element is at the first position, that the eyewear is worn; and a cover defining a window, the first indicator being visible through the window as viewed from a front side of the eyewear to a back side of the eyewear.

2. The eyewear of claim 1, wherein the detecting element is configured to move when the detecting element becomes in contact with a skin or hair of a user of the eyewear.

3. The eyewear of claim 1, wherein the detecting element is configured to slide upward when the detecting element becomes in contact with a nose of a user of the eyewear.

4. The eyewear of claim 1, further comprising a second indicator indicating, when the detecting element is at the second position, that the eyewear is not worn.

5. The eyewear of claim 4, wherein the second indicator is visible through the window as viewed from the front side of the eyewear to the back side of the eyewear.

6. The eyewear of claim 4, wherein the first and second indicators differ in indicating features from each other.

7. The eyewear of claim 6, wherein the indicating features include colors, marks, and/or letters.

8. The eyewear of claim 7, wherein the wearing status detector is disposed substantially at a center of the front frame in a lateral direction.

9. The eyewear of claim 8, wherein the front frame includes a first lens holder, and a second lens holder, and the cover is disposed between the first and second lens holders.

10. The eyewear of claim 1, wherein the first indicator is formed on the detecting element.

11. The eyewear of claim 1, wherein the cover accommodates the detecting element and the first indicator, and the detecting element is movable within the cover.

* * * * *